United States Patent
Uematsu et al.

(10) Patent No.: US 7,859,793 B2
(45) Date of Patent: Dec. 28, 2010

(54) MAGNETIC HEAD ASSEMBLY THAT FACILITATES RECOVERY OF A MAGNETIC HEAD SLIDER

(75) Inventors: Yoshio Uematsu, Kanagawa (JP); Kenjirou Watanabe, Kanagawa (JP); Tatsumi Tsuchiya, Kanagawa (JP); Yukihiro Nakamura, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 852 days.

(21) Appl. No.: 11/804,035

(22) Filed: May 15, 2007

(65) Prior Publication Data
US 2007/0263323 A1 Nov. 15, 2007

(30) Foreign Application Priority Data
May 15, 2006 (JP) ............................. 2006-135180

(51) Int. Cl.
*G11B 5/60* (2006.01)
(52) U.S. Cl. ............... 360/234.6; 360/234.5; 360/245.2
(58) Field of Classification Search .............. 360/234.5, 360/234.6, 245.2
See application file for complete search history.

(56) References Cited

U.S. PATENT DOCUMENTS

| 5,880,908 | A | * | 3/1999 | Shiraishi et al. | .......... | 360/234.6 |
|---|---|---|---|---|---|---|
| 6,078,472 | A | | 6/2000 | Mitoh et al. | | |
| 6,947,258 | B1 | * | 9/2005 | Li | .............. | 360/234.6 |
| 7,006,331 | B1 | * | 2/2006 | Subrahmanyam et al. | .......... | 360/245.9 |
| 7,369,364 | B2 | * | 5/2008 | Jang et al. | ................ | 360/234.5 |
| 2005/0030667 | A1 | * | 2/2005 | Sato et al. | ................ | 360/234.6 |
| 2006/0187584 | A1 | * | 8/2006 | Watanabe | ................ | 360/234.5 |

FOREIGN PATENT DOCUMENTS

| JP | 2000-298812 | 10/2000 |
|---|---|---|
| JP | 2002-197628 | 7/2002 |

* cited by examiner

*Primary Examiner*—Jefferson Evans
(74) *Attorney, Agent, or Firm*—Mahamedi Paradice Kreisman LLP; Christopher J. Brokaw

(57) ABSTRACT

A magnetic head assembly in which a slider can be removed with deformation of a suspension suppressed and the posture angle of a magnetic head can be maintained stably and a magnetic disk drive mounted with the magnetic head assembly. A head gimbal assembly (HGA) according to an embodiment includes a suspension, a magnetic head slider provided with a magnetic head element section, and a gimbal retaining the slider and connected to the suspension. The gimbal includes a spacer formed around a conductive adhesive application area. A nonconductive adhesive application area having a planar dimension not larger than that of the conductive adhesive application area is formed outside the spacer. The gimbal and the slider are brought into conduction through a conductive adhesive applied to the conductive adhesive application area and are adhered to each other with a nonconductive adhesive applied to the nonconductive adhesive application area.

10 Claims, 10 Drawing Sheets

MAGNETIC HEAD ASSEMBLY THAT FACILITATES RECOVERY OF A MAGNETIC HEAD SLIDER

CROSS-REFERENCE TO RELATED APPLICATION

The instant nonprovisional patent application claims priority to Japanese Application No. 2006-135180 filed May 15, 2006 and incorporated by reference in its entirety herein for all purposes.

BACKGROUND OF THE INVENTION

There are known devices, such as disk drives, which use different types of recording disks such as optical disks, optical magnetic disks and flexible magnetic disks. Among them, the hard disk drive (HDD) has become so popular as to be one of the indispensable storage devices for today's computer systems. Further, not limited to computers, the hard disk drive is widening its range of application more and more due to the superior characteristics, including movie picture recording/reproducing apparatuses, car navigation systems, cellular phones, and removable memories for digital cameras.

Each magnetic disk used in hard disk drives has a plurality of data tracks formed concentrically. In each data track, a plurality of data sectors are recorded which contain a plurality of servo data including address information and user data. Data can be written to and read from a desired data sector by a head element section which accesses the data sector according to the address information of the servo data.

The head element section is mounted on a slider, which is fixedly attached to the suspension of an actuator. The assembly of the actuator and the head slider is called a head stack assembly (HAS). The assembly of the suspension and the head slider is called a head gimbal assembly (HGA).

The pressure resulting from the viscosity of the air between a slider air bearing surface (ABS) facing a magnetic disk and the rotating magnetic disk balances with the pressure applied by a suspension toward the magnetic disk. This causes the head slider to fly above the magnetic disk at a fixed gap therebetween.

The suspension includes a flexible support member (which is also called flexure or gimbal) which retains the head slider on the side of a magnetic disk-facing surface, and a load beam, which retains the gimbal on the side of the magnetic disk-facing surface. The gimbal is formed deformably so that the slider may incline in a desired direction to accommodate the tilt of the magnetic disk.

The magnetic head slider normally operates at a significantly small flying height above the surface of the high-speed rotating magnetic disk. When it contacts, starts or stops (CSS) for example, the slidable movement of the air bearing surface of the magnetic head slider and the surface of the magnetic head causes static electricity. If static electricity occurs on the magnetic head slider, it may damage the magnetic head element section. To prevent this damage, a conductive adhesive is applied to the boundary face between a lateral face of the magnetic head slider and the gimbal to establish electrical connection between the magnetic head slider and the gimbal.

In general, the conductive adhesive comprises a nonconductive adhesive and a conductive material (filler metal or the like) such as silver mixed therewith. In a severe usage environment concerning temperature, vibration or others, however, the conductive material such as filler metal may drop, which may cause a sliding accident between the magnetic head slider and the magnetic disk. The magnetic head slider is bonded to the gimbal with a normal adhesive (nonconductive adhesive). This adhesive may protrude from the lower portion of the magnetic head slider and reach the terminal of wiring on the gimbal. This may exert a bad influence on the joint between the terminal of the wiring on the gimbal and the terminal of wiring from the magnetic head element section. In particular, the miniaturized magnetic head slider is liable to encounter this event.

Figure 10:
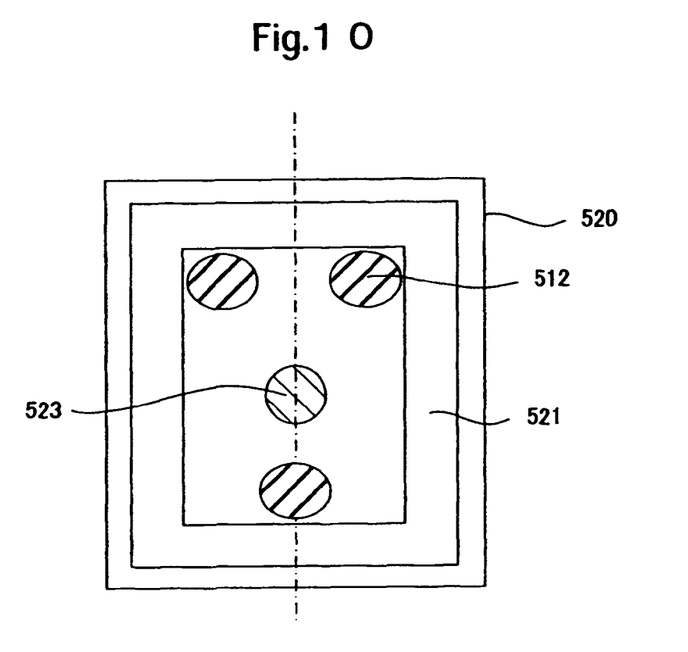
FIG. 10 is an enlarged schematic diagram of a slider mount section of an existing HGA.

To prevent such an occurrence, a conventional gimbal of the magnetic head assembly has been configured as shown in FIG. 10, such that a shield surrounding a conductive adhesive area is provided to prevent the conductive adhesive from being bared. As shown in FIG. 10, in an area 520 on which a magnetic head is mounted, a conductive adhesive 523 is surrounded by a shield 521 so as to prevent failure resulting from drop of the conductive adhesive 523. Incidentally, since having a weak adhesive force, the conductive adhesive 523 is normally applied together with a nonconductive adhesive 512.

Figure 11:
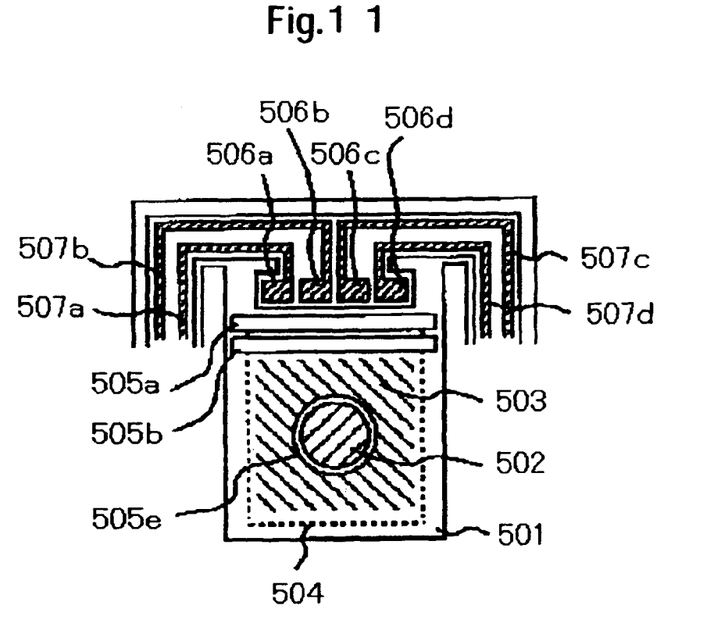
FIG. 11 is a plan view of an end section of a flexible support member included in a conventional magnetic head assembly.

Japanese Laid-Open No. 2000-298812 ("Patent Document 1") discloses a magnetic head assembly having protrusion-preventive walls disposed between a conductive adhesive application area and electrode terminals connected to wiring disposed on gimbal. FIG. 11 is a plan view of an end portion of a flexible support member included in the magnetic head assembly described in Patent Document 1.

As shown in FIG. 11, electrode terminals 506a, 506b, 506c and 506d connected respectively to lines 507a, 507b, 507c and 507d are disposed on gimbal 501 made of a metal material such as SUS304. The electrode terminals 506a, 506b, 506c and 506d are each connected to a corresponding one of electrode terminals of a magnetic head slider (not shown) on the side of the magnetic head element section. Protrusion-preventive walls 505a and 505b are disposed between the electrode terminals 506a, 506b, 506c, 506d and the conductive adhesive application area 502. The conductive adhesive application area 502 is disposed at the almost-center of a magnetic head slider attachment portion 504. A conductive adhesive protrusion-preventive wall 505e is disposed to surround the conductive adhesive application area 502. A nonconductive adhesive application area 503 is disposed around the preventive wall 505e.

Incidentally, along with the increased amount of information, the recent hard disk drives have been required to promote high-storage capacity, high-performance and miniaturization. Therefore, also magnetic head assemblies themselves have been demanded to have high accuracy, reduced size, and high-reliability. Consequently, fly height concerning read/write performance of a magnetic head has an increased influence on the performance of a product. The fly height-related performance of the product cannot be confirmed until an HGA is actually assembled and subjected to an operation test.

In general, if the operation test shows that a magnetic head slider is defective, it is discarded with a suspension. In order to more decrease cost, it is desired to recover the suspension.

The suspension is designed with emphasis on performance because of HDD performance, improvement in anti-shock performance and adoption of a femtoslider. A thin plate spring (gimbal) attached with a magnetic head slider uses a stainless steel thin plate having a thickness of 15 μm, so that it is easily deformed with external force. If it is intended to recover the suspension by removing the magnetic head slider from the gimbal, it is extremely difficult to recover the suspension because of the deformed gimbal. The major reason is that the shield surrounding the above-mentioned conductive adhesive area makes it hard for a solvent dissolving the adhesive to penetrate thereinto, and therefore, the adhesive force of the adhesive hardly lowers. If the magnetic head slider is intended to be forcibly peeled off, the suspension will bend and thus cannot be recovered. On the other hand, for the configuration of Patent Document 1 described above, since the nonconductive adhesive is applied to the outside of the protrusion-preventive wall, the solvent resolving the adhesive easily penetrates into the nonconductive adhesive, so that it is probable that the suspension may be recovered.

However, the above-described shield or preventive wall (hereinafter, referred to as the spacer) functions as a base which maintains the head slider and gimbal parallel to each other or at a stable angle formed therebetween. That is, it has a function of stabilizing the posture angle of the magnetic head. Further, the spacer has a function in which the thickness of the spacer maintains the thickness of the conductive adhesive to be uniform, thereby reducing variations of resistance values between the slider and the gimbal resulting from the variation of the conducive adhesive.

In particular, a femtoslider, which will become mainstream in the future, imposes increasingly strict requirements on the posture angle of the head. For the specifications of the posture angle as examples, a picoslider with a large-sized slider has a posture angle of +1.2°, whereas some femtosliders need to have a posture angle of +0.40, which is about three times the accuracy for the picoslider.

In short, the suspension needs to be configured to stabilize the posture angle of the head. Since the adhesive area 502 is exposed in the configuration described in Patent Document 1, the solvent easily penetrates the adhesive area 502 at the time of dismantle, which makes it possible to recover the suspension. However, because of the narrow conductive adhesive area, variations in the application positions and amounts of application of the conductive adhesive easily cause the conductive adhesive to run on the preventive wall. In addition, the protrusion of the conductive adhesive poses problems in that not only the posture angle not be controlled, but also the joint with the terminals of the lines from the magnetic head element section is adversely affected.

BRIEF SUMMARY OF THE INVENTION

An object of embodiments in accordance with the present invention is to provide a magnetic head assembly in which a slider can be removed with deformation of a suspension suppressed and the posture angle of a magnetic head can be maintained stably, and a magnetic disk drive mounted with the magnetic head assembly.

Figure 4A:
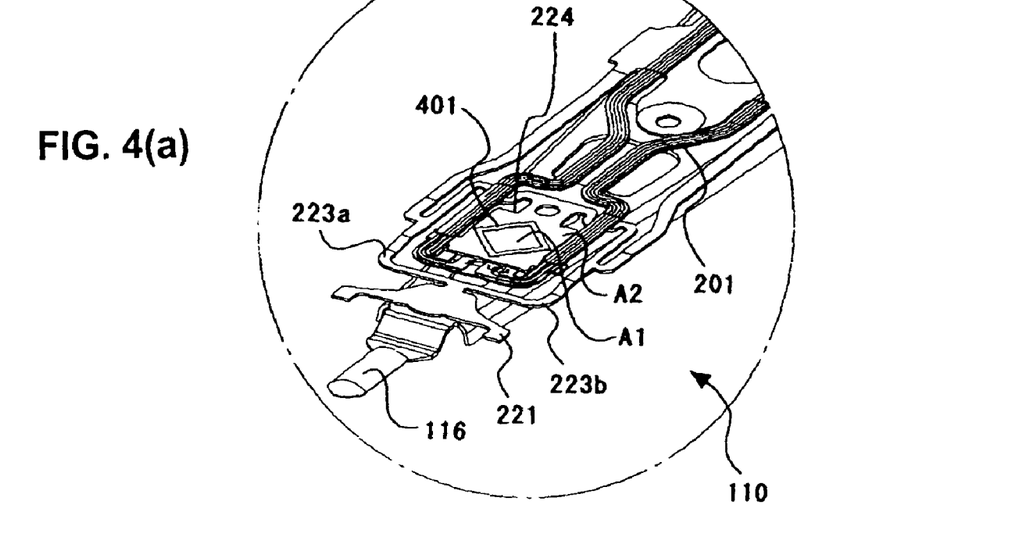
FIGS. 4(a) and 4(b) are an enlarged perspective view and an enlarged plan view, respectively, illustrating the slider mount section of the HGA according to the embodiments of the present invention.
Figure 4B:
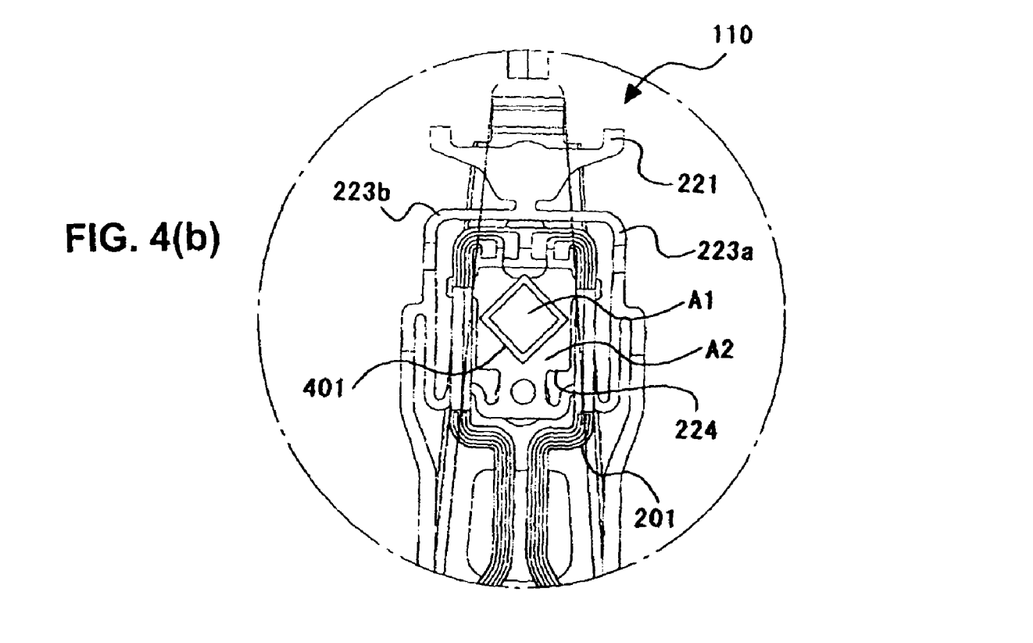
Figure 5A:
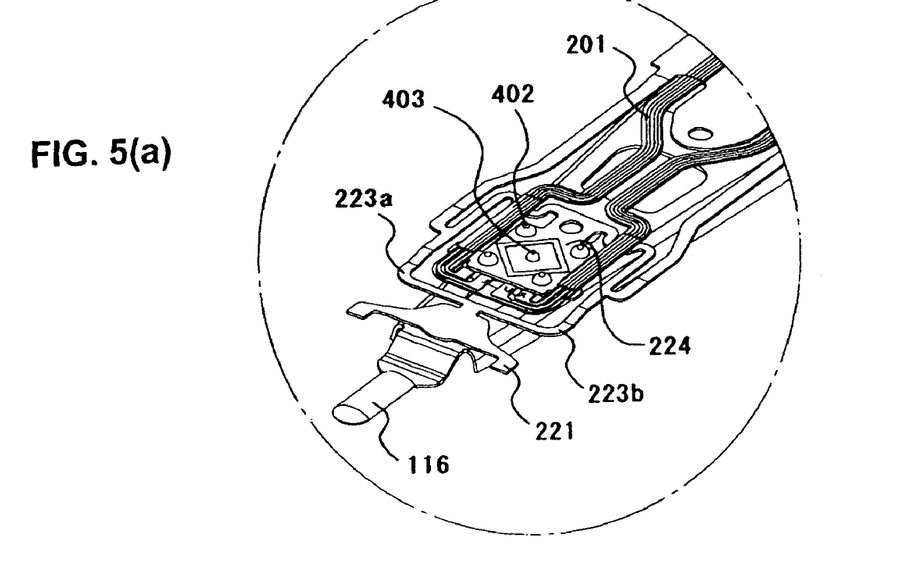
FIGS. 5(a) and 5(b) are an enlarged perspective view and an enlarged plan view, respectively, illustrating the slider mount section of the HGA according to embodiments of the present invention, in which a conductive adhesive and a nonconductive adhesive are applied to the slider mount section.
Figure 5B:
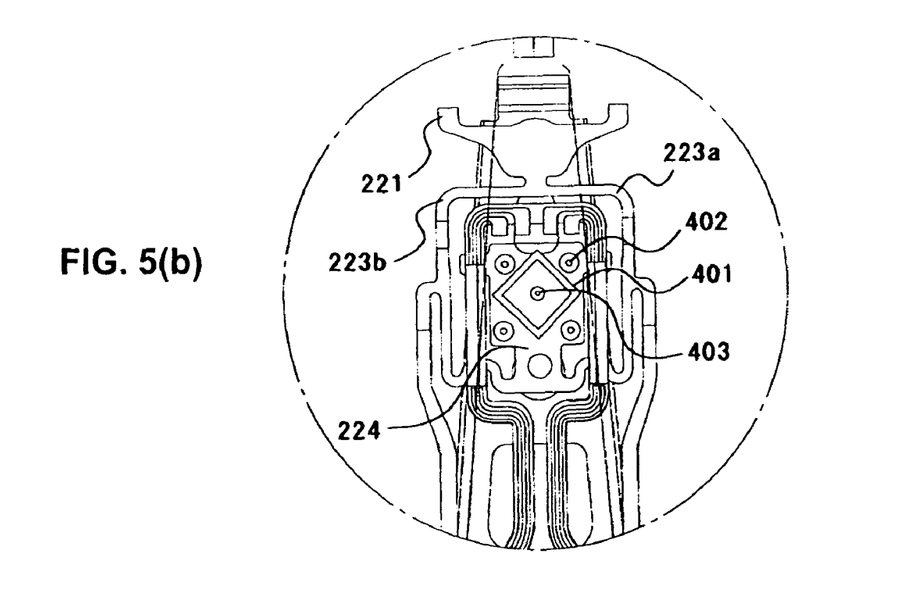

An HGA according to the particular embodiments shown in FIGS. 4 and 5, includes a suspension, a magnetic head slider provided with a magnetic head element section, and gimbal retaining the slider and connected to the suspension. The gimbal includes a spacer 401 formed around a conductive adhesive application area A1. A nonconductive adhesive application area A2 having a planar dimension not larger than that of the area A1 is formed outside the slider 401. The gimbal and the slider are brought into conduction through a conductive adhesive 403 applied to the area A1, and are adhered to each other with a nonconductive adhesive 402 applied to the area A2.

DETAILED DESCRIPTION OF THE INVENTION

Embodiments in accordance with the present invention relate to a magnetic head assembly that facilitates recovery of a magnetic head slider provided with a magnetic head element section which accesses a disk and reads or writes data from or to the disk, and a magnetic disk drive mounted with the magnetic head assembly.

Embodiments of the present invention have been made to solve problems as described above, and it is an object of embodiments of the present invention to provide a magnetic head assembly in which a slider can be removed with the deformation of a suspension suppressed and the posture angle of a magnetic head can stably be maintained, and a magnetic disk drive mounted with the magnetic head assembly.

To achieve the object described above, a magnetic head assembly according to an embodiment of the present invention includes: a suspension; a magnetic head slider provided with a magnetic head element section; and a flexible support member retaining the magnetic head slider and connected to the suspension; wherein the flexible support member includes a spacer formed around a first application area with a second application area formed around the spacer so as to have a planar dimension not larger than that of the first application area; and wherein the flexible support member and the magnetic head slider are brought into conduction through a conductive material applied to the first application area and are adhered to each other with a nonconductive adhesive applied to the second application area.

According to one embodiment of the present invention, the conductive material applied to the first application area can bring the magnetic head slider and the flexible support member into conduction. The spacer is formed to surround the conductive material and the nonconductive adhesive is applied to the outside of the spacer. The nonconductive adhesive adheres the magnetic head slider to the flexible support member. This prevents drop of the conductive material and makes it easy for the solvent to penetrate the nonconductive adhesive at the time of dismantle, which facilitates removal of the magnetic head slider from the flexible support member. Since the first application area formed in the spacer is larger than the second application area, the conductive material is prevented from protruding when applied to the first application area.

Preferably, the second application area is disposed in an area of the flexible support member to which the magnetic head slider is adhered so as to be axisymmetric with respect to the rotational direction of a disk when the magnetic head assembly is moved above the disk. Since the application area is disposed axisymmetrically with respect to the back-and-forth direction of the magnetic head slider, the posture angle of the magnetic head slider can be stabilized.

The nonconductive adhesive may be applied in an area of the flexible support member to which the magnetic head slider is adhered so as to be axisymmetric with respect to the rotational direction of a disk when the magnetic head assembly is moved above the disk. Since the nonmagnetic adhesive is applied axisymmetrically with respect to the back-and-forth direction of the magnetic head slider, the posture angle of the magnetic head slider can be stabilized.

An amount of application of the nonconductive adhesive is more than that of the conductive adhesive. For example, the amount of application of the nonconductive adhesive is two times or more than that of the conductive material. A small amount of the conductive material suffices if the conductive material can provide conduction.

Since the spacer can be set at 15 μm or less in height, it is applicable to an extremely small magnetic head assembly.

Another magnetic head assembly according to an embodiment of the present invention includes: a suspension; a magnetic head slider provided with a magnetic head element section; and a flexible support member retaining the magnetic head slider and connected to the suspension; wherein the flexible support member includes a spacer which defines a gap between the flexible support member and the magnetic head slider and which is formed discontinuously; wherein the flexible support member and the magnetic head slider are adhered to each other with a nonconductive adhesive and is brought into conduction through a conductive material; and wherein the conductive material is entirely circumferentially surrounded by the spacer and the nonconductive adhesive applied at least to the discontinuous portion of the spacer.

In the present embodiment, since the conductive material is entirely circumferentially surrounded by the spacer and the nonconductive adhesive, it can be prevented from dropping. In addition, since the spacer is formed discontinuously, the solvent used when the head slider is removed from the flexible support member can be made to penetrate the nonconductive adhesive, which facilitates the recovery of the magnetic head slider.

A magnetic disk drive according to an embodiment of the present invention includes: a disk; a magnetic head assembly including a suspension, a magnetic head slider provided with a magnetic head element section which accesses the disk and reads or writes data therefrom or thereto, and a flexible support member retaining the magnetic head slider and connected to the suspension; a voice coil motor driving the magnetic head assembly; and a control unit controlling the voice coil motor, wherein the flexible support member includes a spacer formed around a first application area with a second application area formed around the spacer so as to have a planar dimension not larger than that of the first application area; and wherein the flexible support member and the magnetic head slider are brought into conduction through a conductive material applied to the first application area and are adhered to each other with a nonconductive adhesive applied to the second application area.

In the present embodiment, the suspension is configured to be easily recovered even after the magnetic head assembly or the magnetic disk drive is assembled; therefore, the magnetic disk drive having high productivity can be provided.

The present embodiment can provide a magnetic head assembly in which a slider can be removed with deformation of a suspension suppressed and the posture angle of a magnetic head can be maintained stably and a magnetic disk drive mounted with the magnetic head assembly.

Hereinafter, embodiments to which the present invention is applicable will be described. For clarification of explanation, the following description and drawings are appropriately omitted and simplified. In addition, in the drawings, like elements are denoted with like reference numerals and duplicate explanation is omitted as necessary for clarification of explanation.

Figure 1:
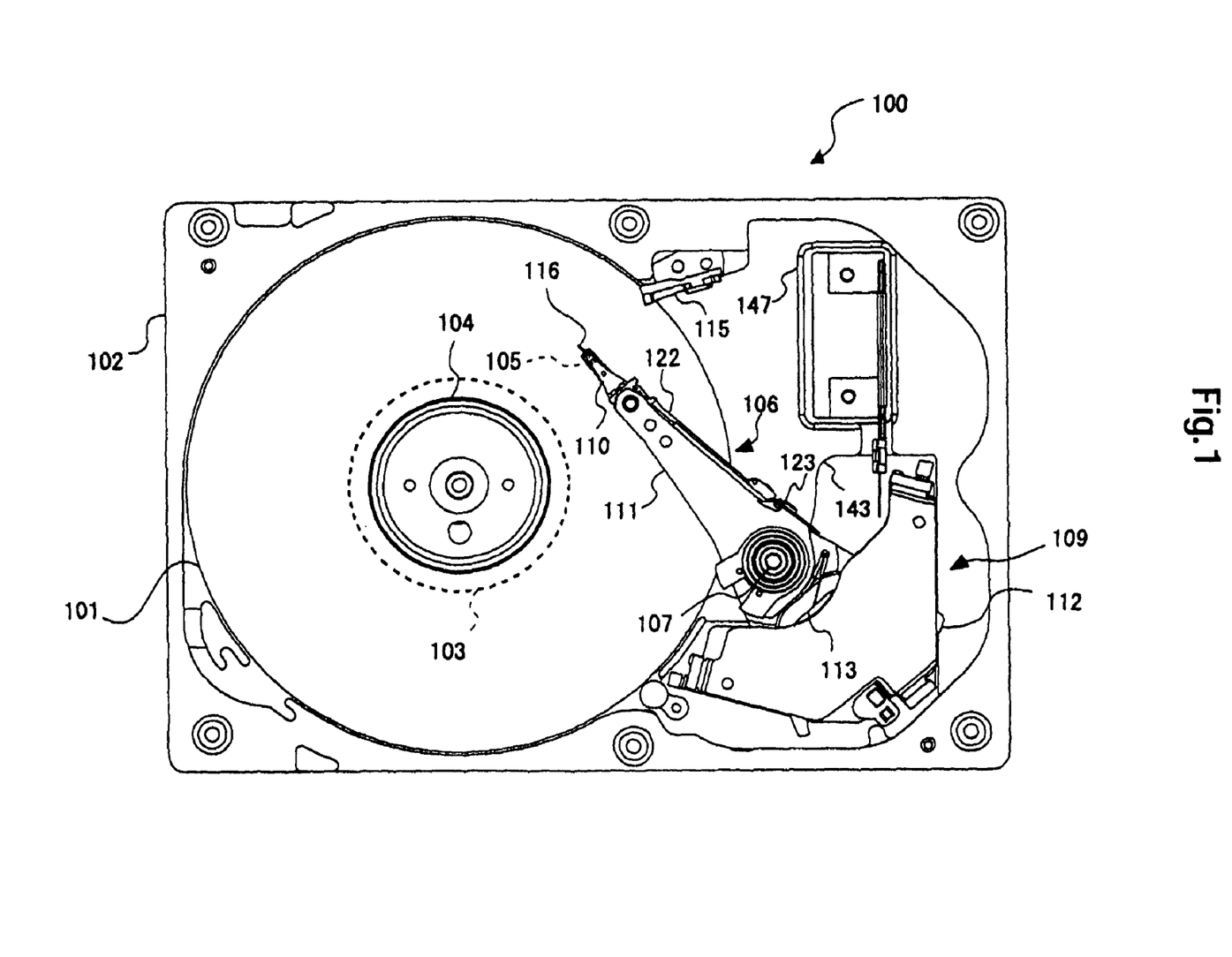
FIG. 1 is a plan view schematically illustrating the entire configuration of a HDD 100 according to an embodiment of the present invention.

Before the detailed explanation of the features of the present embodiments, the entire configuration of an HDD is first described. FIG. 1 is a plan view schematically illustrating the entire configuration of an HDD 100 according to the present embodiment. A magnetic disk 101 is an example of disks adapted to record data thereto. This magnetic disk 101 is a nonvolatile recording disk, which records data by magnetizing a magnetic layer. A base 102 is fastened via a gasket (not shown) to a cover (not shown) closing the upper opening of the base 102, thus constituting a disk enclosure, which is an example of a casing. The disk enclosure can house the constituent elements of the HDD 100.

A cramp 104 fastens a magnetic disk 101 to a spindle motor 103. The spindle motor 103 is fastened to the bottom of the base 102. The magnetic disk 101 is drivingly rotated at a desired angular speed by the spindle motor 103. A head slider 105 accesses the magnetic disk 101. The head slider 105 includes a head element section and a slider to which the head element section is fixed. The actuator 106 retains and moves the head slider 105.

The actuator 106 is pivotally retained by a pivot shaft 107 and includes a voice coil motor (VCM) 109 serving as a drive mechanism which turns the actuator itself. The actuator 106 includes constituent members, namely, the suspension 110, an arm 111 and a coil support 112 retaining a flat coil 113, which are connected to each other in this order from the leading end thereof on which the head slider 105 is disposed. When the actuator 106 and its constituent elements are described, a portion close to the pivot shaft 107 is referred to as the rear side and a portion close to the leading end of the actuator 106 is referred to as the front side in the present specification. In addition, in the present specification, the assembly of the head slider 105 and the suspension 110 is called a head gimbal assembly (HGA). The configuration of the suspension 110 supporting the head slider 105 is described in detail later.

A ramp 115 is disposed close to the outer circumferential end of the magnetic disk 101 so as to have a withdrawal position to which the head slider 105 is unloaded from above the magnetic disk 101 when the rotation of the magnetic disk 101 is stopped for example. The actuator 106 is turned to allow the head slider 105 to be unloaded to the withdrawal position and to be loaded to above the magnetic disk 101 from the withdrawal position. A tab 116 is formed at the leading end of the suspension 110 and slides on the ramp 115 when loading/unloading operation is performed. In addition to this, there is known a CSS (Contact Start and Stop) system in which when data read/write operation is not performed, the head slider 105 is withdrawn to a zone arranged on the inner circumference of the magnetic disk 101. The CSS system is applicable to the HDD according to the present embodiment.

To read and write data from and to the magnetic disk 101, the actuator 106 moves the head slider 105 to above a data area on the surface of the rotating magnetic disk 101. The pivotal movement of the actuator 106 moves the head slider 105 along the radial direction of the recording surface of the magnetic disk 101. The balance between force generating on the ABS (Air Bearing Surface) of the head slider 105 facing the magnetic disk 101 and the pressing force of the suspension 110 causes the head slider 105 to fly above the magnetic disk 101 at a desired gap.

A signal between the head slider 105 and a preamp IC 123 is transmitted by a trace 122 fixed to the actuator 106. The trace 122 extends along the lateral side facing the turning direction of the arm 111 and on the side opposite the side of the magnetic disk 101. An FPC 143 is connected via a connector 147 to a control circuit board (not shown) mounted on the rear face of the base 102 in a circuit-like manner. The FPC 143 transmits a signal between a control circuit and the preamp IC 123. The control circuit controls the operation of the HDD 100 and performs the signal processing thereof. Incidentally, the HDD 100 can include a single, or a plurality of the magnetic disks 101. Each magnetic disk can be formed with a recording surface on one side or both sides thereof. The HDD 100 is provided with an HGA associated with each recording surface.

Figure 2A:
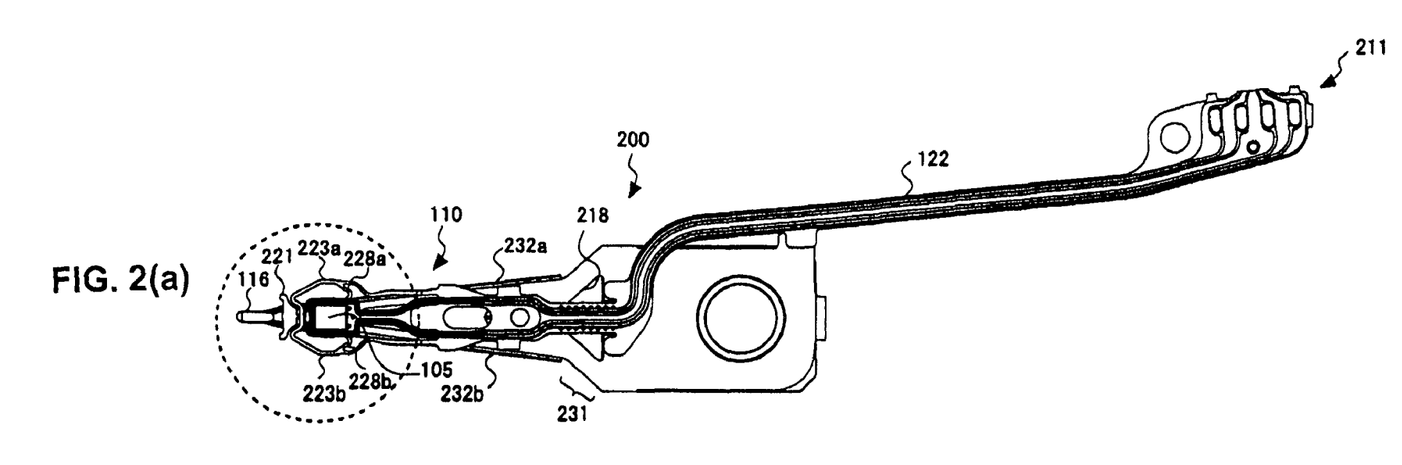
FIGS. 2(a) and 2(b) are plan views schematically illustrating the configuration of a HGA 200, which is an example of a head assembly, according to the present embodiment.
Figure 2B:
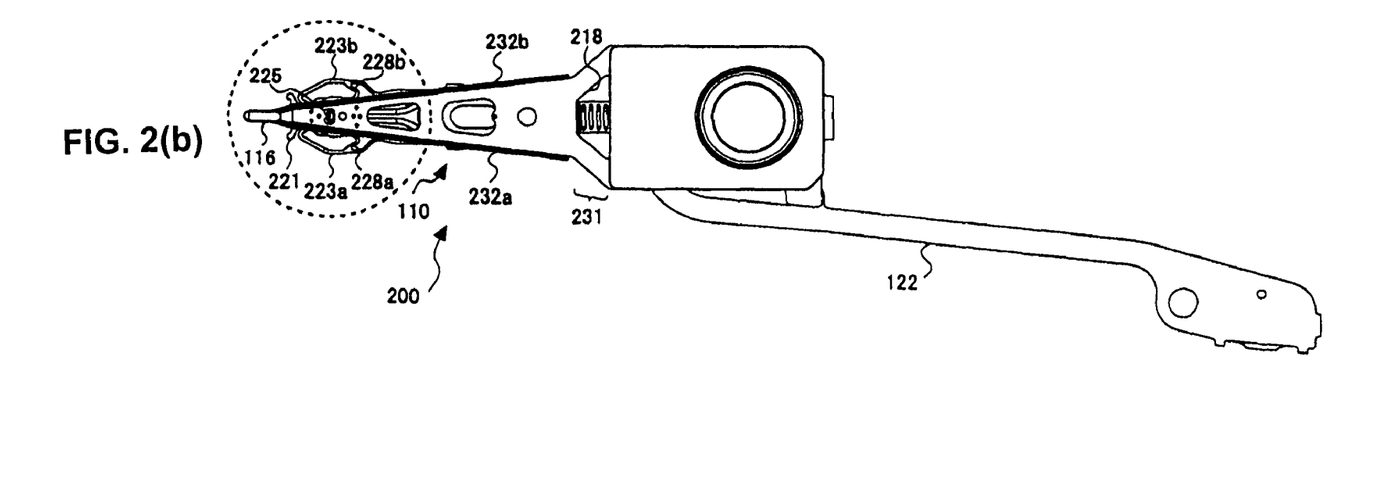
Figure 3:
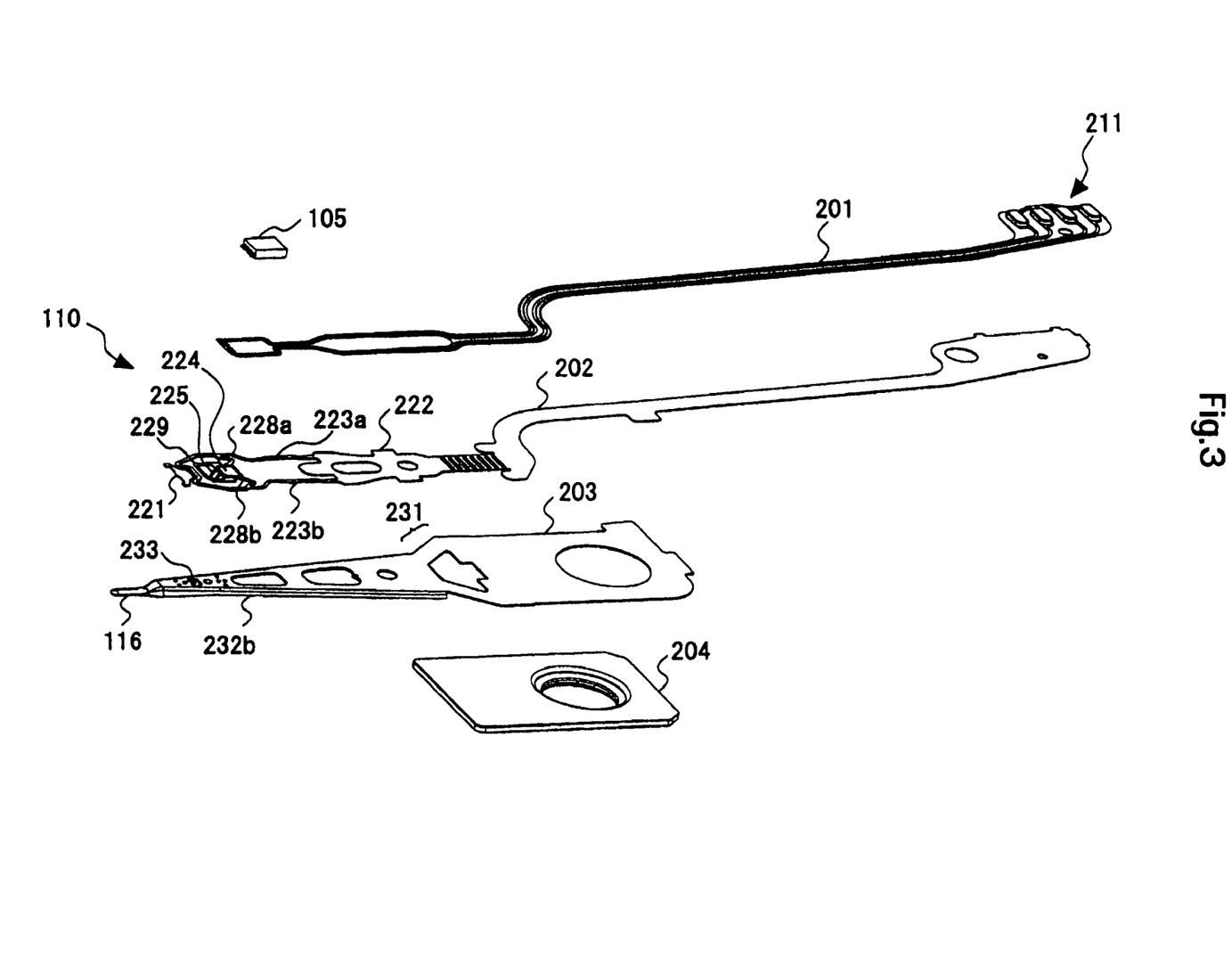
FIG. 3 is an exploded perspective view illustrating the constituent elements of the HGA 200 according to embodiments of the present invention.

FIGS. 2(a) and 2(b) are plan views schematically illustrating the configuration of the HGA 200 of an embodiment, which is an example of the head assembly. FIG. 2(a) illustrates the configuration of the HGA 200 as viewed from the side of the magnetic disk 101 (the head slider 105). FIG. 2(b) illustrates the configuration of the HGA 200 as viewed from the opposite side of the magnetic disk 101. FIG. 3 is an exploded perspective view illustrating the constituent elements of the HGA 200. A description will be below made with reference to these figures.

As shown in FIG. 3, the suspension 110 of the embodiment includes a flexible cable 201, gimbal 202, a load beam 203 and a mount plate 204. The flexible cable 201 and part of the gimbal 202 located therebelow constitute the trace 122. In the flexible cable 201, a polyimide insulating layer is integrally formed with a plurality of leads out of contact with each other.

The respective one ends of the leads constitute a multi-connector 211 to be connected to the FPC 147. The other respective ends of the leads close to the head slider 105 are connected to a pad formed on the head slider 105. The flexible cable 201 is fixed to the gimbal 202 with an adhesive. Incidentally, the same structure can be directly formed on the gimbal 202.

The load beam 203 is formed of stainless steel as a precise thin plate spring. Its shape is designed so that the load beam 203 is thin and lightweight and can maintain necessary rigidity. The rigidity of the load beam 203 is higher than that of the gimbal 202. As shown in FIGS. 2(a) and 2(b), both edge portions extend along its longitudinal direction (the direction from the tab 116 (the front side) to the pivotal shaft (the rear side)) to a hinge portion 231. Such both edge portions are bent in a direction apart from the magnetic disk 101 (the downward direction in FIG. 3) to form respective flanges 232a and 232b. The flanges 232a and 232b increases the rigidity of the load beam 203. As shown in FIG. 2, the hinge portion 231 has an opening 218 and is not formed with the flanges 232a and 232b. Having a spring characteristic, the hinge portion 231 generates a weight applied to the head slider 105, which balances with the force generated on the ABS of the head slider 105.

Both the mount plate 204 and the gimbal 202 are integrated with the load beam 203 by laser spot welding or caulking. The mount plate 204 and the gimbal 202 are formed of e.g. stainless steel. A gimbal tab 221 is formed at the front end of the gimbal 202. The gimbal tab 221 is adapted to prevent the permanent deformation of the gimbal 202 by contact with the ramp 115 when the head slider 105 undergoes an external shock during the withdrawal on the ramp 115.

The gimbal 202 is fixed to the load beam 203 at a gimbal base portion 222. The front portion of the gimbal 202 including gimbal arms 223a, 223b and a gimbal tongue 224 is not fixed, that is, it is in a free state. The gimbal arms 223a and 223b extend from a gimbal base portion 222 toward the head slider 105. In addition, the gimbal arms 223a and 223b elastically support the gimbal tongue 224, which is an example of a tongue portion being contiguous to the gimbal arm 223 and formed at the front portion of the gimbal arm 223. The gimbal tongue 224 is connected to the gimbal arms 223a and 223b by link arms 228a and 228b respectively. The link arms 228a and 228b extend in the turning direction. A rectangular ring 229 is disposed on the front of the gimbal tongue 224 so as to support a part of the flexible cable 201.

As shown in FIG. 2(a), the head slider 105 is fixedly attached on the magnetic disk side surface of the gimbal tongue 224. The gimbal tongue 224 is formed with a limiter tab 225 which restricts the movement of the gimbal. In FIG. 3, the limiter tab 225 is retained by a projection 233 of the load beam 203 so as to prevent the large deformation of the gimbal 202. The limiter tab 225 and the projection 233 constitute a limiter mechanism.

The magnetic head assembly according to the present embodiment is next described in detail. FIGS. 4(a) and 4(b) are an enlarged perspective view and an enlarged plan view, respectively, illustrating the slider mount section of the HGA according to the embodiment. As shown in FIGS. 4(a) and 4(b), a spacer 401 shaped in a rhombus as viewed from above is formed in a head slider mount section in the gimbal tongue 224. A conductive adhesive and a nonconductive adhesive are applied to the head slider mount position in the gimbal tongue 224 for bonding the slider thereto. The HGA according to the present embodiment is configured such that if a slider is found to be a defect after it was mounted, the slider is removed to make it possible to reuse the suspension 110. For this purpose, a conductive adhesive application area A1 as a first application area is provided at the slider mount position in the gimbal tongue 224 so as to be surrounded by the spacer 401. The conductive adhesive applied to the conductive adhesive application area A1 electrically connects the magnetic head slider with the gimbal. In addition, the spacer 401 prevents the sliding accident between the magnetic head slider and the magnetic disk resulting from the drop of the conductive adhesive applied to the conductive adhesive application area A1.

As described earlier, the spacer 401 has a function of serving as a base that maintains the head slider and the gimbal parallel to each other or at a stable angle formed therebetween so as to stabilize the posture angle of the magnetic head. In addition, the spacer has a function in which the thickness of the spacer maintains the thickness of the conductive adhesive uniform, thereby reducing variations of resistance values between the slider and the gimbal resulting from the variation of the conducive adhesive. The spacer 401 has a thickness of 15 μm or less for a femtoslider for instance.

An area outside the spacer 401 surrounding the conductive adhesion application area A1 is a nonconductive adhesive application area A2 as a second application area. A nonconductive adhesive is applied to the nonconductive adhesive application area A2, to which the slider is attached. Here, the amount of application of the nonconductive adhesive is extremely small; therefore, it is difficult to control the position and amount of application. Protrusion of the conductive adhesive from the spacer 401 not only has an influence on the posture angle but also causes trouble resulting from drop of the conductive adhesive. For these reasons, in the present embodiment, the application area of the conductive adhesive is increased as much as possible, and particularly is made larger than or equal to that of the nonconductive adhesive application area. This prevents protrusion of the conductive adhesive. Incidentally, the conductive adhesive 403 is needed only to be in paste form so as to be applicable and may have no adhesion force. The nonconductive adhesive having an adhesion force is applied to the outside of the spacer 401. Therefore, when the suspension is recovered, the solvent easily penetrates the nonconductive adhesive, which facilitates removal of the suspension from the gimbal.

Further, to stabilize the posture angle of the magnetic head, the conductive adhesive application area A1 and the nonconductive adhesive application area A2 are each disposed axisymmetrically with respect to the rotational direction of the disk (the back-and-forth direction of the slider) when the magnetic head is located above the disk. In addition, also the conductive adhesive and the nonconductive adhesive are each applied axisymmetrically. FIGS. 5(a) and 5(b) are an enlarged perspective view and an enlarged plan view illustrating the slider mount section of the HGA according to the present embodiment and a state where the conductive adhesive and nonconductive adhesive are applied to the slider mount section.

As shown in FIGS. 5(a) and 5(b), the nonconductive adhesive 402 according to the embodiment is applied to positions outside the spacer 401 and axisymmetric with each other. The conductive adhesive 403 is applied to the center of the conductive adhesive application area A1. A small amount of the conductive adhesive 403 suffices if it can electrically connect the slider with the gimbal. On the other hand, the nonconductive adhesive 402 is applied about four times the conductive adhesive 403 to fix the slider.

Figure 6A:
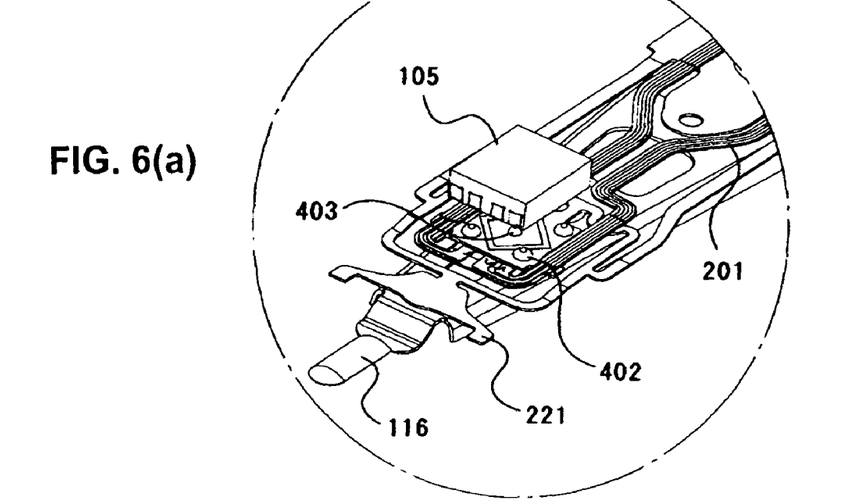
FIGS. 6(a) and 6(b) are perspective views illustrating the processes of mounting a slider on the slider mount section of the HGA according to embodiments of the present invention.
Figure 6B:
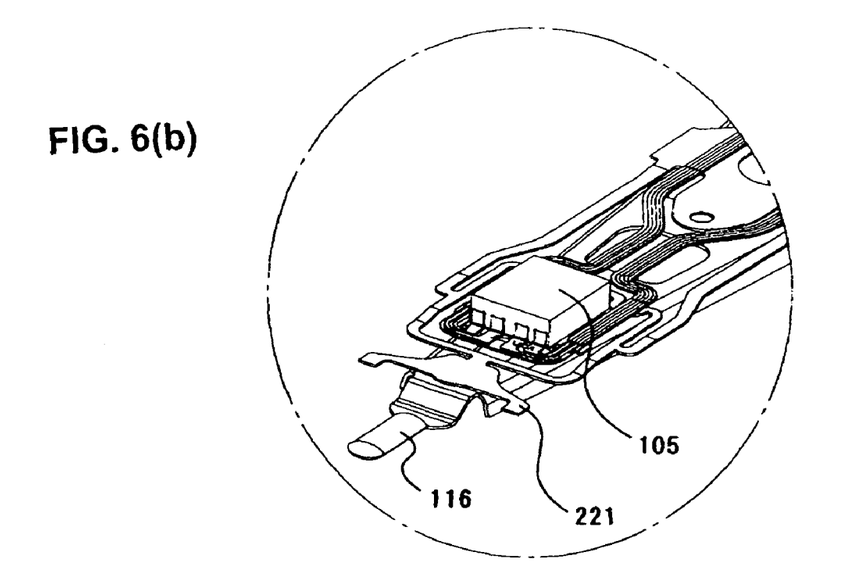

As shown in FIGS. 6(a) and 6(b), the slider 105 is fixedly attached on the conductive adhesive application area A1 and the nonconductive adhesive application area A2. Incidentally, for the application positions of the nonconductive adhesive, since the axisymmetric application can maintain the posture angle, the nonconductive adhesive may be applied to two points on the front or rear of the slider 105 among the four points shown in FIG. 5.

Incidentally, the spacer 401 needs only to be shaped so that the conductive adhesive application region A1 is increased as much as possible while ensuring the nonconductive adhesive application area A2 and the posture angle is stably maintained. The nonconductive adhesive needs only to be applied to the positions axisymmetric with respect to the longitudinal direction of the slider so as to maintain the posture angle stably. Thus, the shape of the spacer 401 and the application positions of the nonconductive adhesive are not limited to the foregoing.

Figure 7A:
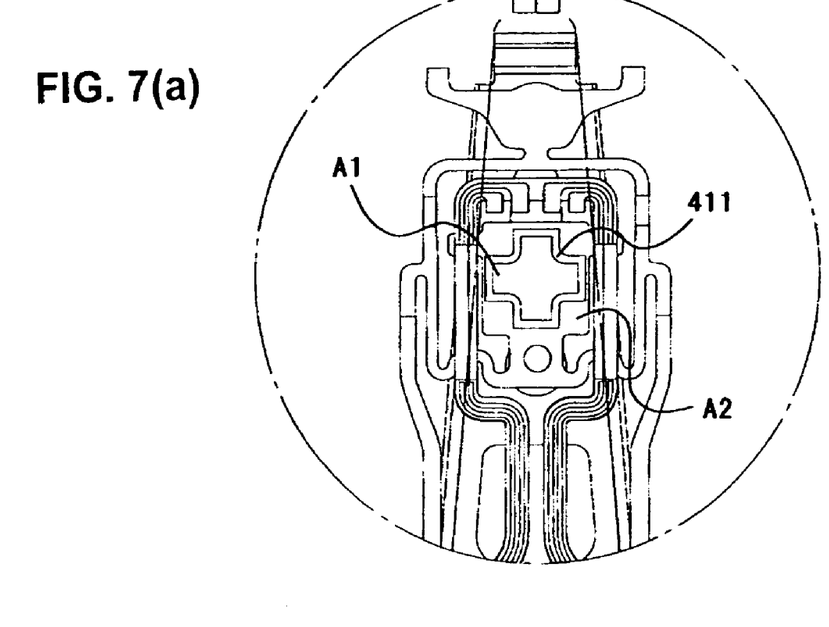
FIGS. 7(a) and 7(b) are enlarged plan views illustrating the slider mount section of another HGA according to embodiments of the present invention.
Figure 7B:
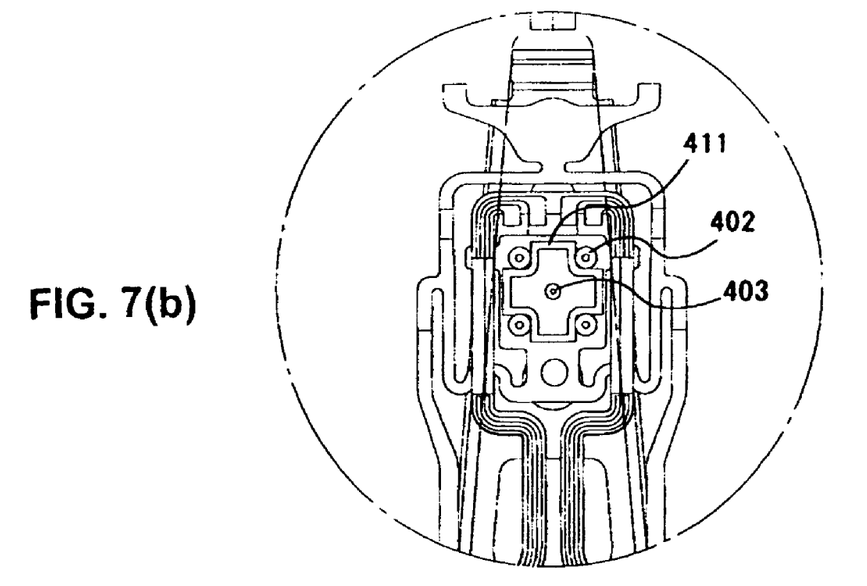

FIGS. 7(a) and 7(b) are enlarged plan views illustrating the slider mount section of another HGA according to the embodiment and the respective states before and after application of the adhesive. As shown in FIGS. 7(a) and 7(b), the spacer 411 may be shaped so that nonconductive adhesive application areas are formed only at four corners of the slider mount section in the gimbal tongue 224. Incidentally, the spacer 411 comprises polyimide or the like and can be formed together with the insulating layer and protecting layer of the flexible cable 201 by etching or the like. The spacer 411 can be easily formed even if it has any shape.

In manufacturing the HDD 100, the head slider 105 is mounted on the suspension 110 with an adhesive to manufacture the HGA 200. After that, the HGA 200 is mounted on testing equipment for tests including a fly height test. If the test shows that the slider is defective, the suspension 110 can be reused by discarding only the slider.

In manufacturing the HGA, a test called a dynamic electric test (DET) is performed. In the DET, the HGA is mounted on the test equipment and performs actual read/write processing on a rotating magnetic disk. In this way, the fly height characteristics and read-write performance of a head slider are evaluated. In the conventional DET, an HGA satisfying the specifications has progressed to the next manufacturing process and an HGA judged to be defective has been discarded. Thus, if the head slider does not satisfy the specifications, the suspension to which the head slider is fixedly attached has been discarded together therewith, resulting in a loss in terms of manufacture of the HGA. In contrast to this, the present embodiment is configured such that the conductive adhesive is surrounded by the spacer so as not to drop, the nonconductive adhesive is applied to the outside of the spacer to attach the suspension to the slider. Thus, the nonconductive adhesive is applied to the outside of the spacer; therefore, the solvent easily penetrates the nonconductive adhesive, thereby facilitating removal.

Figure 8:
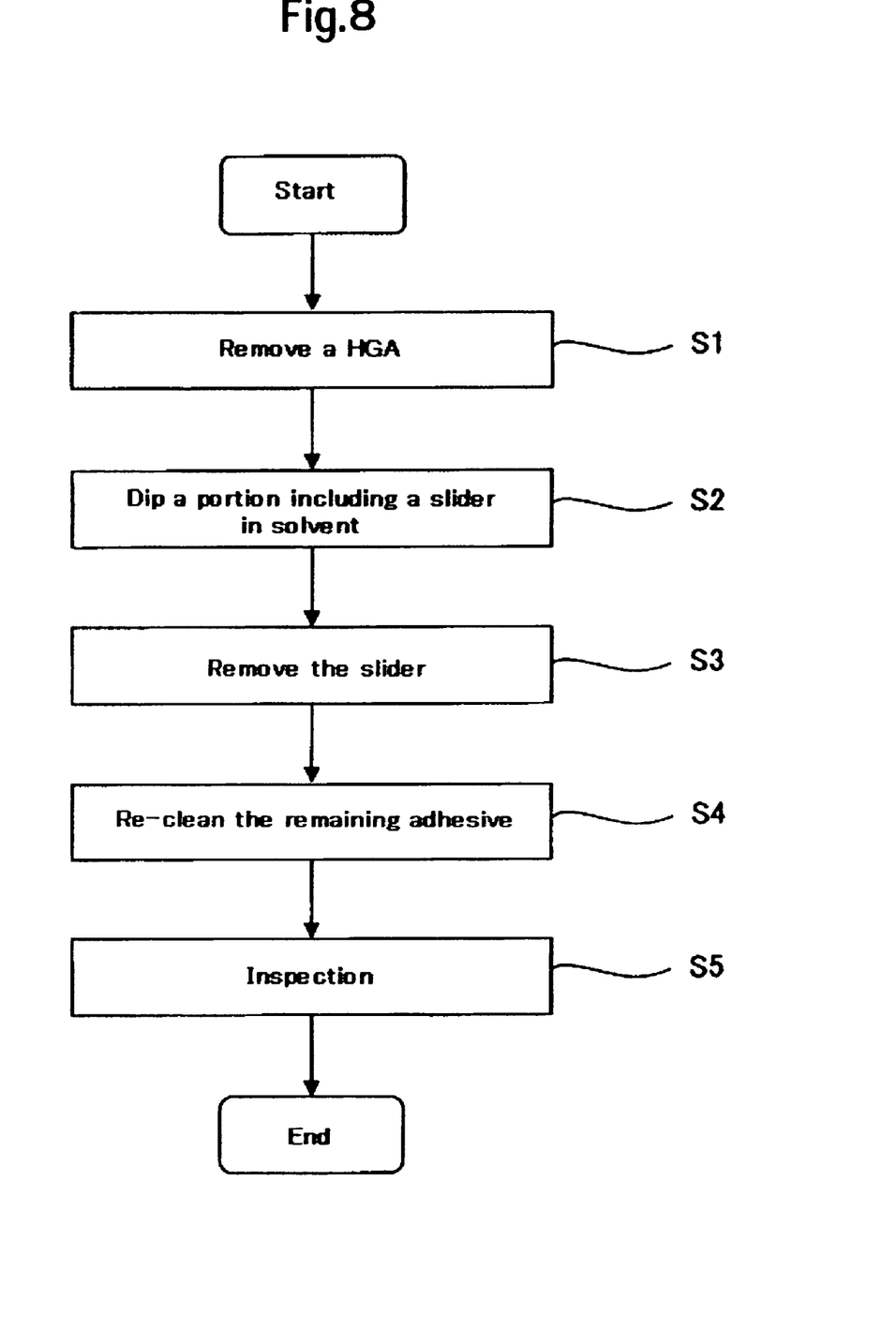
FIG. 8 is a flowchart illustrating the recovery processes of the slider according to an embodiment of the present invention.

FIG. 8 is a flowchart illustrating the recovery process of the slider. When an HDD is found to have a defective slider, to reproduce a suspension, an HGA found to have the defective slider is extracted (step S1). Then, a portion including the slider is dipped in a solvent (step S2). In the present embodiments, since the nonconductive adhesive 402 is applied to the outside of the spacers 401 and 411, the solvent easily penetrates the nonconductive adhesive 402 to lower the adhesion force.

After the adhesion force of the nonconductive adhesive is lowered, the slider is removed (step S3). After removal of the slider, the slider is dipped in a solvent such as alcohol to remove the remaining nonconductive adhesive 402 and conductive adhesive 403 (step 4). Lastly, a test is performed to check whether or not the suspension from which the slider is removed is bent or deformed (Step 5). In this way, the suspension from which the defective slider is removed is again mounted with a new slider thereon, thereby manufacturing an HGA.

Incidentally, the manufacturing process of the HDD is as below. After the HGA is manufactured, the HGA 200 is connected to a COMB which is a component provided with the arm 111 and the flat coil 113 to manufacture the HSA. An AE and the FPC 143 are mounted on the HSA. The spindle motor 103, the HSA, the magnetic disk 101, a VCM magnet and other components are mounted in the base 102 and the opening of the base 102 is closed with a top cover to manufacture the head disk assembly (HDA). A control circuit board is mounted on the back of the base of the HAD and the HDD is finished. The HDD 100 that has passed the final test such as a read-write test is shipped as a product. Incidentally, even if the defect of the slider is detected at this time, it is possible to recover the suspension by dismantling the HDD as with the foregoing.

In the slider mount position of the suspension in the embodiment, the spacer 401 is formed to surround the conductive adhesive application area A1 and the nonconductive adhesive application area A2 is disposed on the outside of the spacer 401. The nonconductive adhesive is applied to the nonconductive adhesive application area A2, to which the slider is adhered. Thus, in the process of recovering the suspension because of the defective slider, it is possible to allow the solvent to easily penetrate the nonconductive adhesive, thereby facilitating removal of the slider. Incidentally, the conductive adhesive is made by mixing silver paste or the like into the nonconductive adhesive. Since the conductive adhesive is weak in adhesion force, the slider can be removed even if the spacer 401 prevents the solvent from penetrating the conductive adhesive. Thus, the suspension can be salvaged, thereby enabling cost reduction.

In addition, the conductive adhesion application area A1 surrounded by the space 401 is increased as much as possible so as to have a planar dimension at least not smaller than that of the nonconductive adhesive application area A2. In particular, as in the recent HDD with a femtoslider, the spacer of the miniaturized HGA has a height of 15 μm or less. If the conductive adhesion application area A1 is not large, then the conductive adhesive easily protrudes from the spacer depending on the application position or the amount of application. In contrast to this, since the application area A1 is increased as much as possible, even if the spacer 401 has a height of 15 μm or less, the conductive adhesive will not protrude from the application area A1 and has no influence on the posture angle. In addition, the conductive adhesive will not drop to cause failure.

The spacer 401 and the nonconductive adhesive application area A2 are each formed axisymmetrically with respect to the longitudinal direction of the slider. Similarly, the nonconductive adhesive is applied axisymmetrically with respect to the longitudinal direction of the slider. Thus, the stable posture angle of the slider can be obtained. Since the spacer 401 is formed in a rhombus, the conductive adhesion application area A1 can be increased and the spacer 401 is formed along the almost-entire area in the longitudinal direction of the slider. This can make the posture angle more stable.

It is a matter of course that the present invention is not limited to the embodiments described above and can be modified or altered in various ways without departing from the gist of the invention. For example, while the conductive adhesive application area is surrounded by the spacer 401 in the embodiments described above, the invention is not limited to the case where the conductive adhesive application area is surrounded by the spacer in order to prevent the drop of the conductive adhesion. That is to say, the conductive adhesive may be surrounded by the spacer and the nonconductive adhesive. In this case, to make it possible to recover the suspension, the nonconductive adhesive needs only to be penetrated by the solvent when being dipped in the solvent.

Figure 9A:
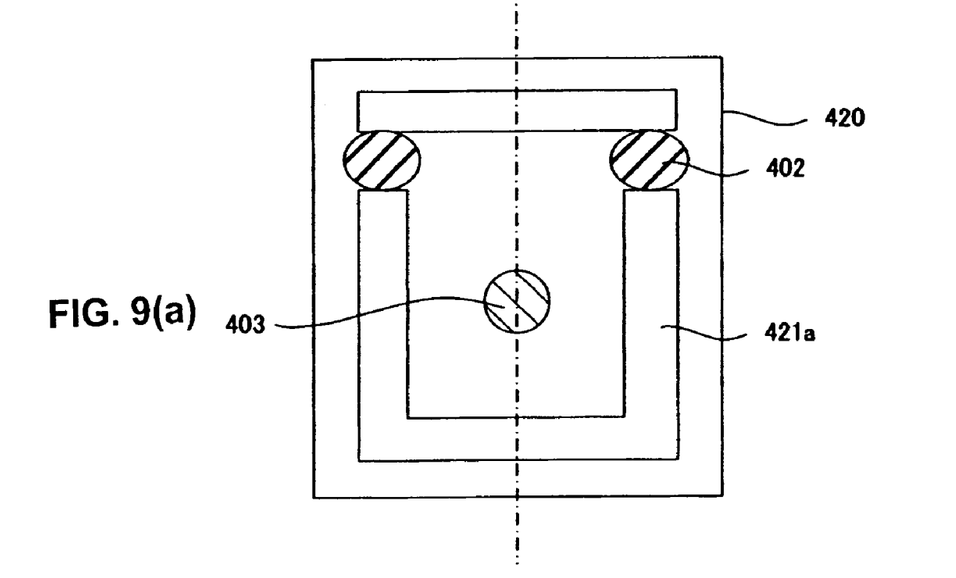
FIGS. 9(a) and 9(b) illustrate the shape of a spacer and the application positions of a nonconductive adhesive according to another embodiment of the present invention.
Figure 9B:
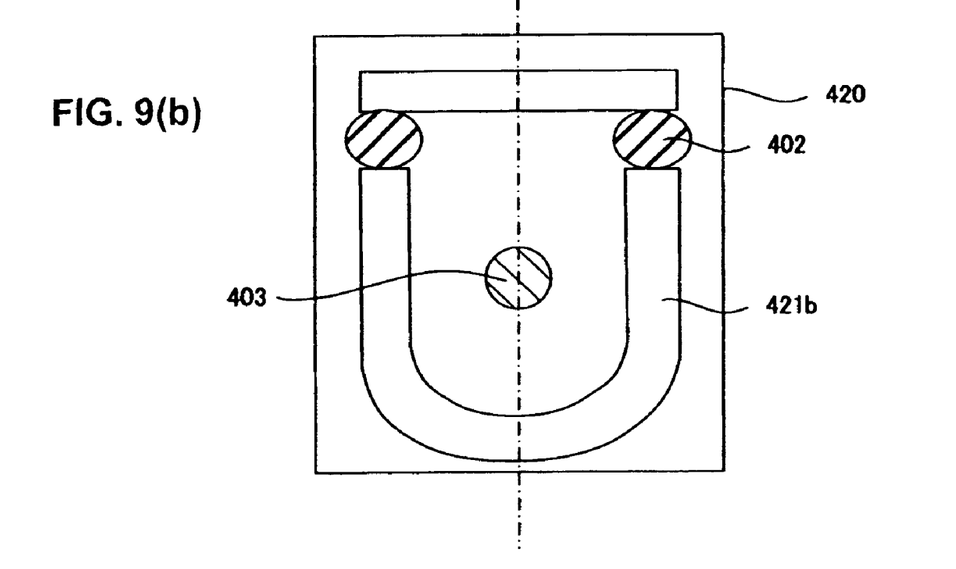

FIGS. 9(a) and 9(b) illustrate other examples of the shapes of spacers and the application positions of nonconductive adhesives. As shown in FIG. 9(a), a spacer 421a is discontinuously configured to have openings while surrounding a conductive adhesive application area A1. A nonconductive adhesive 402 may be applied so as to fill the discontinuous portions of the spacer 421a so that the nonconductive adhesive 402 and the spacer 421a surround a conductive adhesive 403. Since the spacer 421a and the nonconductive adhesive 402 can surround the entire circumference of the conductive adhesive 403, the conductive adhesive 403 can be prevented from dropping. In addition, since the nonconductive adhesive 402 is applied to the discontinuous portions of the spacer 421a, a solvent easily penetrates the nonconductive adhesive 402 at the time of dismantle, thereby enabling the reuse of the suspension. Similarly to the foregoing, as shown in FIG. 9(b), a spacer 421b is discontinuously configured to have openings while surrounding a conductive adhesive application area A1. A nonconductive adhesive 402 may be applied so as to fill the discontinuous portions of the spacer 421b so that the nonconductive adhesive 402 and the spacer 421b surround a conductive adhesive 403. Since the spacer 421b and the nonconductive adhesive 402 can surround the entire circumference of the conductive adhesive 403, the conductive adhesive 403 can be prevented from dropping. In addition, since the nonconductive adhesive 402 is applied to the discontinuous portions of the spacer 421b, a solvent easily penetrates the nonconductive adhesive 402 at the time of dismantle, thereby enabling the reuse of the suspension.

What is claimed is:

1. A magnetic head assembly comprising:
   a suspension;
   a magnetic head slider provided with a magnetic head element section; and
   a flexible support member retaining the magnetic head slider and connected to the suspension;
   wherein the flexible support member includes a contiguous spacer formed entirely around a first application area with a second application area formed around the spacer so as to have a planar dimension not larger than that of the first application area; and
   wherein the flexible support member and the magnetic head slider are brought into conduction through a conductive material applied to the first application area and are adhered to each other with a nonconductive adhesive applied to the second application area.

2. The magnetic head assembly according to claim 1, wherein the second application area is disposed in an area of the flexible support member to which the magnetic head slider is adhered so as to be axisymmetric with respect to the rotational direction of a disk when the magnetic head assembly is moved above the disk.

3. The magnetic head assembly according to claim 2, wherein the nonconductive adhesive is applied in an area of the flexible support member to which the magnetic head slider adhered so as to be axisymmetric with respect to the rotational direction of a disk when the magnetic head assembly is moved above the disk.

4. The magnetic head assembly according to claim 1, wherein the nonconductive adhesive is applied in an area of the flexible support member to which the magnetic head slider adhered so as to be axisymmetric with respect to the rotational direction of a disk when the magnetic head assembly is moved above the disk.

5. The magnetic head assembly according to claim 1, wherein the first application area is positioned at an almost-center of an area of the flexible support member to which the magnetic head slider is opposed.

6. The magnetic head assembly according to claim 1, wherein an amount of application of the nonconductive adhesive is more than that of the conductive adhesive.

7. The magnetic head assembly according to claim 1, wherein an amount of application of the nonconductive adhesive is two times or more than that of the conductive material.

8. The magnetic head assembly according to claim 1, wherein the spacer has a height of 15 μm or less.

9. A magnetic head assembly comprising:
   a suspension;
   a magnetic head slider provided with a magnetic head element section; and
   a flexible support member retaining the magnetic head slider and connected to the suspension;
   wherein the flexible support member includes a spacer which defines a gap between the flexible support member and the magnetic head slider and which is formed discontinuously;

wherein the flexible support member and the magnetic head slider are adhered to each other with a nonconductive adhesive and is brought into conduction through a conductive material; and wherein the conductive material is partially circumferentially surrounded by the spacer and the nonconductive adhesive applied at least to the discontinuous portion of the spacer.

10. A magnetic disk drive comprising:

a disk;

a magnetic head assembly including:

a suspension;

a magnetic head slider provided with a magnetic head element section which accesses the disk and reads or writes data therefrom or thereto; and a flexible support member retaining the magnetic head slider and connected to the suspension;

a voice coil motor driving the magnetic head assembly; and a control unit controlling the voice coil motor;

wherein the flexible support member includes a contiguous spacer formed entirely around a first application area with a second application area formed around the spacer so as to have a planar dimension not larger than that of the first application area; and wherein the flexible support member and the magnetic head slider are brought into conduction through a conductive material applied to the first application area and are adhered to each other with a nonconductive adhesive applied to the second application area.

* * * * *